United States Patent
Shibuya et al.

(10) Patent No.: US 7,948,659 B2
(45) Date of Patent: May 24, 2011

(54) HALFTONING DEVICE AND HALFTONING METHOD AND LASER PRINTER INCLUDING THE SAME

(75) Inventors: Takeshi Shibuya, Ibaraki (JP); Nobuyuki Sato, Kanagawa (JP); Naoyuki Urata, Kanagawa (JP); Shiro Kofuji, Kanagawa (JP)

(73) Assignee: Ricoh Company, Ltd., Ohta-Ku, Tokyo (JP)

( * ) Notice: Subject to any disclaimer, the term of this patent is extended or adjusted under 35 U.S.C. 154(b) by 924 days.

(21) Appl. No.: 11/507,609

(22) Filed: Aug. 22, 2006

(65) Prior Publication Data

US 2007/0046999 A1    Mar. 1, 2007

(30) Foreign Application Priority Data

Aug. 23, 2005 (JP) ................ P2005-241243

(51) Int. Cl.
    *H04N 1/405* (2006.01)
(52) U.S. Cl. ...... 358/3.13; 358/1.9; 358/3.06; 358/3.09; 358/3.14; 358/534; 358/535
(58) Field of Classification Search ........... 358/3.06, 358/3.08, 3.09, 3.1, 3.3
    See application file for complete search history.

(56) References Cited

U.S. PATENT DOCUMENTS

| | | | | |
|---|---|---|---|---|
| 5,790,704 A | * | 8/1998 | Rao et al. | 382/237 |
| 5,815,286 A | * | 9/1998 | Matsuba et al. | 358/3.19 |
| 5,898,820 A | * | 4/1999 | Borg et al. | 358/1.9 |
| 6,041,139 A | * | 3/2000 | Okubo et al. | 382/199 |
| 6,191,868 B1 | * | 2/2001 | Shibuya et al. | 358/1.9 |
| 2003/0107768 A1 | * | 6/2003 | Crounse | 358/3.3 |
| 2005/0105818 A1 | * | 5/2005 | Hoshi | 382/254 |

FOREIGN PATENT DOCUMENTS

| | | |
|---|---|---|
| JP | 8-98025 | 4/1996 |
| JP | 8-317213 | 11/1996 |
| JP | 2000-4359 | 1/2000 |
| JP | 2000-94752 | 4/2000 |
| JP | 2001-94782 | 4/2001 |
| JP | 2002-94785 | 3/2002 |
| JP | 2002-185787 | 6/2002 |
| JP | 2003-8897 | 1/2003 |
| JP | 2005-205856 | 8/2005 |
| JP | 2001-94782 | 4/2008 |

OTHER PUBLICATIONS

Japanese Office Action dated Aug. 25, 2009 and English translation thereof.

* cited by examiner

*Primary Examiner* — King Y Poon
*Assistant Examiner* — Richard Zhu
(74) *Attorney, Agent, or Firm* — McGinn IP Law, PLLC (57) ABSTRACT

A halftoning device that converts an input pixel signal of 8 bits per pixel into an output pixel signal of r bits per pixel (r<8), the halftoning device includes: a gradation correction unit that expands the input pixel signal into an expanded pixel signal of n bits per pixel(n>8); a threshold value array storage that stores a threshold value array having a threshold value of 8 bits; and a threshold value expansion unit that expands the threshold value of 8 bits to expanded threshold value of n bits per pixel. A range of the expanded pixel signal output from the gradation correction unit is matched with a range of the expanded threshold value. The output pixel signal is set according to a comparison of the expanded pixel signal with the expanded threshold value corresponding to the threshold value that is selected for each input pixel signal.

15 Claims, 9 Drawing Sheets

| INPUT VALUE (BINARY) | OUTPUT VALUE | OUTPUT PATTERN | INPUT VALUE (BINARY) | OUTPUT VALUE | OUTPUT PATTERN |
|---|---|---|---|---|---|
| 00000 | 0000 | | 10000 | 0000 | |
| 00001 | 1000 | | 10001 | 0001 | |
| 00010 | 1100 | | 10010 | 0011 | |
| 00011 | 1110 | | 10011 | 0111 | |
| 01111 | 1111 | | 11111 | 1111 | |

| INPUT VALUE (BINARY) | OUTPUT VALUE | OUTPUT PATTERN | INPUT VALUE (BINARY) | OUTPUT VALUE | OUTPUT PATTERN |
|---|---|---|---|---|---|
| 00000 | 00000000 | | 00000 | 00000000 | |
| 00001 | 10000000 | | 10001 | 10000000 | |
| 00010 | 11000000 | | 10010 | 11000000 | |
| 00011 | 11100000 | | 10011 | 11100000 | |
| 00100 | 11110000 | | 10100 | 11110000 | |
| 00101 | 11111000 | | 10101 | 11111000 | |
| 00110 | 11111100 | | 10110 | 11111100 | |
| 00111 | 11111110 | | 10111 | 11111110 | |
| 01111 | 11111111 | | 11111 | 11111111 | |

| | GEOMETRY OF BASIC THRESHOLD VALUE PATTERN | DISPLACEMENT VECTOR | NUMBER OF DOTS CONSTITUTING HALFTONE DOT | Np | S | NUMBER OF DISTRIBUTIONS ($2^S$) | $\Delta h$ ($=Np \cdot 2^S$) | $S_1$ | MAXIMUM THRESHOLD VALUE* (max{nc}) | TOTAL NUMBER OF STEPS OF GRADATION (nmax+1) |
|---|---|---|---|---|---|---|---|---|---|---|
| (1) | | (4, 0) (0, 4) | 16 | 4 | 2 | 4 | 16 | 0 | 63 | 257 |
| | | | | | 3 | 8 | 32 | 0 | 127 | 513 |
| | | | | 8 | 1 | 2 | 16 | 0 | 63 | 257 |
| | | | | | 2 | 4 | 32 | 0 | 127 | 513 |
| (2) | | (4, 1) (-1, 4) | 17 | 4 | 2 | 4 | 16 | 0 | 67 | 273 |
| | | | | | 3 | 8 | 32 | 1 | 135 | 545 |
| | | | | 8 | 1 | 2 | 16 | 0 | 67 | 273 |
| | | | | | 2 | 4 | 32 | 1 | 135 | 545 |
| (3) | | (4, 2) (-2, 4) | 20 | 4 | 2 | 4 | 16 | 0 | 79 | 321 |
| | | | | | 3 | 8 | 32 | 1 | 159 | 641 |
| | | | | 8 | 2 | 4 | 16 | 0 | 79 | 321 |
| | | | | | 3 | 8 | 32 | 1 | 159 | 641 |
| (4) | | (3, 3) (-3, 3) | 18 | 4 | 2 | 4 | 16 | 0 | 71 | 289 |
| | | | | | 3 | 8 | 32 | 1 | 143 | 577 |
| | | | | 8 | 1 | 2 | 16 | 0 | 71 | 289 |
| | | | | | 2 | 4 | 32 | 1 | 143 | 577 |
| (5) | | (3, 0) (0, 3) | 9 | 4 | 3 | 8 | 32 | 0 | 71 | 289 |
| | | | | 8 | 2 | 4 | 32 | 0 | 71 | 289 |
| (6) | | (3, 1) (-1, 3) | 10 | 4 | 3 | 8 | 32 | 0 | 79 | 321 |
| | | | | 8 | 2 | 4 | 32 | 0 | 79 | 321 |
| (7) | | (2, 2) (-2, 2) | 8 | 4 | 3 | 8 | 32 | 0 | 63 | 257 |
| | | | | 8 | 2 | 4 | 32 | 0 | 63 | 257 |

*) MAXIMUM THRESHOLD VALUE ACQUIRED WHEN PROCESSING PERTAINING TO (STEP3) IS NOT PERFORMED

HALFTONING DEVICE AND HALFTONING METHOD AND LASER PRINTER INCLUDING THE SAME

BACKGROUND OF THE INVENTION

1. Field of the Invention

The present invention relates to a printer, a copier, a facsimile, or the like, and to a halftoning device or a halftoning method that enables grayscale of 256 levels (8 bits) or more by combining a plurality of pixels. In the present invention, a raster device that forms an image in the form of a rectangular array of the pixels, such as a printer, a copier, a facsimile, or the like, is typically called a printer.

2. Description of the Related Art

In order to cause the printer to represent 256 levels (8 bits) of gradation called continuous tone, there must be performed image conversion which effects halftone representation as changes in areas where a plurality of pixels are ON state and is called halftoning.

Common halftoning methods include an ordered dither method for determining the ON/OFF state of a pixel by comparing a value in a previously-prepared array of threshold values with an input pixel value; and an error diffusion method which re-distributes an error, which arises with reference to an input gradation value as a result of ON/OFF state of the pixel, over peripheral pixel values.

Further, ordered dither methods include clustered-dot halftoning for forming periodic clustered-dots from a plurality of adjacent pixels and effecting gradation expression by changing in the area of the clustered-dots, and a diffused halftoning (Bayer) method for homogeneously distributing ON dots in given areas in a diffused manner.

In a laser type printer, where reproduced pixels are likely to become unstable, among the halftoning methods a clustered-dot halftone method is preferably used, because the clustered-dot halftone method enables to lower an influence of fluctuations of one pixel to a gradation characteristic and is superior in terms of gradation representation stability.

Meanwhile, a trade-off exists between the density of clustered-dots and a gradation characteristic during clustered-dot halftoning. A monochrome binary printer of 600 dpi encounters a problem in achieving compatibility between a gradation characteristic and a resolution. For example, in the printer of 600 dpi, when each of clustered-dots is formed from 3-by-3 pixels, a resolution of 200 dpi=600/3 is achieved. The acquired number of steps of gradation, including a white background, is merely 3×3+1=10. In order to cause a printer, which provides two steps of gradation for one pixel, to provide 256 steps of gradation, one clustered-dot is formed from 16×16. The density of clustered-dots comes to 600/16=37.5 dpi. Thus, very coarse clustered-dots are acquired.

In the case of a printer of laser beam type or LED array type, a method for subdividing one pixel of the printer by PWM (Pulse Width Modulation) is available in relation to the above problems. Further, there is used a method for generating multi-gradation from one dot by a PAM (Pulse Amplitude Modulation) method for modulating exposure intensity of one dot.

However, even in the case of these methods, a pulse interval for one pixel becomes shorter in response to a recent speedup of the printer. For this reason, there arises a problem of requiring multiple laser beams in order to sub-divide a pulse because of the response speed of pulse generation or limitations on development following capability, or a problem of difficulty in achieving compatibility between multilevels of intensity variation and cost reduction, such as an increase in development cost because of complication of an LED.

In order to solve these problems, U.S. Pat. No. 6,191,868 and JP-A-2001-94782 describe a method for effecting distribution while achieving a compatibility between clustered-dot halftoning with multiple center dots that grow through cyclic dispersion, and PWM. JP-A-2002-185787 describes, as a method for storing a threshold value array, a method for computing, from a basic threshold value pattern, an interval between threshold values assigned essentially uniformly to the number of output gradation steps and generating an array of threshold values.

SUMMARY OF THE INVENTION

As in the case of the related art, when the number of steps of gradation of one pixel, which has been subjected to multigradation, is not sufficiently large even when there is performed hybridization of three methods; namely, a method for multigradation of one pixel, a method for forming a clustered-dot, and a method for diffusing a clustered-dot, a problem arises in the consistency of distribution of bits to be assigned to the methods.

For instance, in the method of U.S. Pat. No. 6,191,868, when only four steps of multigradation (except a white background) can be achieved by one dot and when a basic threshold value pattern of 20 steps of gradation described in U.S. Pat. No. 6,191,868 shown in FIG. 10(e) is used, the number of diffusion steps, which is less likely to raise a visual problem, is limited to a diffusion number of power-of-two type. When PWM includes four steps or thereabouts, the intermediate number of steps of PWM cannot be obtained by reducing the number of steps of PWM.

In consideration of these facts, there are implemented merely two ways of distribution; namely, (a total number of steps of gradation)=(a basic threshold value pattern: 20 steps of gradation)×(the number of steps of diffusion: 2)×(the number of steps of one dot: 4)+(white background: 1)=161 steps, or (a total number of steps of gradation)=(a basic threshold value pattern: 20 steps of gradation)×(the number of steps of diffusion: 4)×(the number of steps of one dot: 4)+(white background: 1)=321 steps The former way of distribution is slightly deficient in the number of steps of gradation for high-quality printing. In order to implement the latter way of distribution, the method described in U.S. Pat. No. 6,191,868 requires an array of threshold values which stores 9-bit values, which exceeds the range of eight bits.

Data are usually written into and read from memory while a multiple of eight bits is taken as a unit. Storing a threshold value, which exceeds eight bits, leads to consumption of valuable resources of a gradation processor predicated on memory saving, such as a halftoning device accommodated in a printer.

In JP-A-2001-94782, there is proposed a method for switching a table for assigning a PWM signal to an output gradation value in association with the level of an input gradation value or a threshold value. In this case, the table of PWM cannot be changed in association with the complicated layout of threshold values, and hence processing for aligning the direction of growth of PWM to the geometry of a clustered-dot is difficult. Providing additional information, which is associated to the layout of such threshold values, aside from a threshold value table or increasing the bit width of the threshold value to eight bits or more leads to consumption of memory, as in the case of the previous method.

In the case of the method described in JP-A-2002-185787, a range which stores the array of threshold values to be finally used still requires eight bits. Therefore, when consideration is given to application of the range to the number of steps of gradation exceeding eight bits, there is a problem of an increase in the size of an array as mentioned previously.

The present invention has been made in view of above circumstance and provides a halftoning device and a halftoning method. According to an aspect of the invention, the halftoning device handles a halftoning based on a hybrid of three methods; namely, high gradation of one pixel, formation of a clustered-dot, and diffusion of a clustered-dot, even when the total number of gradation steps achieved by combining the methods exceeds the 8-bit range. As a result, a problem due to consistency of distribution of bits is avoided. Even when the number of steps of gradation achieved by one pixel is not sufficiently large, the number of steps of gradation which enables implementation of high-quality printing is provided. Further, storing a threshold value at eight bits or less as in the case of the related art contributes to saving of memory resources of the gradation processor.

According to another aspect of the invention, there is provided a halftoning device that converts an input pixel signal $n_i$ of eight bits per pixel into an output pixel signal $n_o$ of r bits. The halftoning device includes: a gradation correction unit that expands the input pixel signal $n_i$ into an en expanded pixel signal $n_i'$ of n bits (n>8); a threshold value array storage that stores a threshold value $n_c$ at eight bits; and a threshold value expansion unit that expanding a threshold value $n_c$ of the eight bits to an expanded threshold value $n_c'$ of n bits, wherein a range of a value output from the gradation correction unit is matched with a range of the expanded threshold value $n_c'$ generated by the threshold value expanded unit, and the output pixel signal $n_o$ is set according to a comparison of the expanded pixel signal with the expanded threshold value corresponding to the threshold value that is selected for each input pixel signal.

Moreover, the threshold value expansion unit includes a register that stores a threshold value scale factor Np. $n_d$ is a threshold value obtained by subtracting the highest bit that indicates additional information from the threshold value $n_c$ of eight bits. The threshold value expansion unit multiplies a higher-order (n-s) bit by the factor Np while maintaining a lower-order s bit of the threshold value, to thus generate the expanded threshold value $n_c'$. An output gradation value input to the output conversion table is generated so that all bits of the output gradation value is set to 0 when $\Delta n<0$ is satisfied; that all bits of the output gradation value is set to 1 when $\Delta n>\Delta h'$ is satisfied; and that the output gradation value is set to satisfy $\Delta n/(2^s)$ in other cases, by a comparison of a constant $\Delta h'$ (=Np×$(2^s)$−1) and a difference value $\Delta n$ (=$n_i'-n_c'$), which is between the expanded pixel signal $n_i'$ and an expanded threshold value $n_c'$ corresponding to a threshold value $n_i$ sequentially selected for each input pixel signal $n_i$, where a fractional portion is discarded or curtailed.

According to the above configuration, there can be provided a halftoning method compatible with a diffused clustered-dot method that stores a threshold value, which does not exceed eight bits, as a threshold value array and that is capable of addressing the number of steps of gradation exceeding an eight bit range without expanding in memory the threshold value array exceeding eight bits.

Also, the threshold value formed into seven bits or less can be imparted with switching information used for switching an output pattern of one bit. Thus, switching of an output pattern associated with the threshold value array can be performed without increasing the threshold value array.

BRIEF DESCRIPTION OF THE DRAWINGS

Embodiments of the present invention will be described in detail based on the following figures, wherein.

DETAILED DESCRIPTION OF THE INVENTION

According to an embodiment of the present invention, there is provided a laser printer that enables PWM processing for dividing one dot into four subdivisions. There is employed a threshold value array formed from 64 to 80 threshold values which have been determined by quadrupling 16 to 20 threshold value patterns in accordance with a method shown in FIG. 3 to be described later. In relation to the threshold value array, an expanded threshold value $n_c'$ is generated by taking s=2, Np=4, and $\Delta h'$=31. An output pixel signal $n_o$ is handled separately according to a case, by comparing the constant $\Delta h'$ with a difference value $\Delta n$ between the expanded threshold value and an expanded pixel signal $n_i'$ matched with the range of the expanded threshold value $n_c'$.

Figure 4:
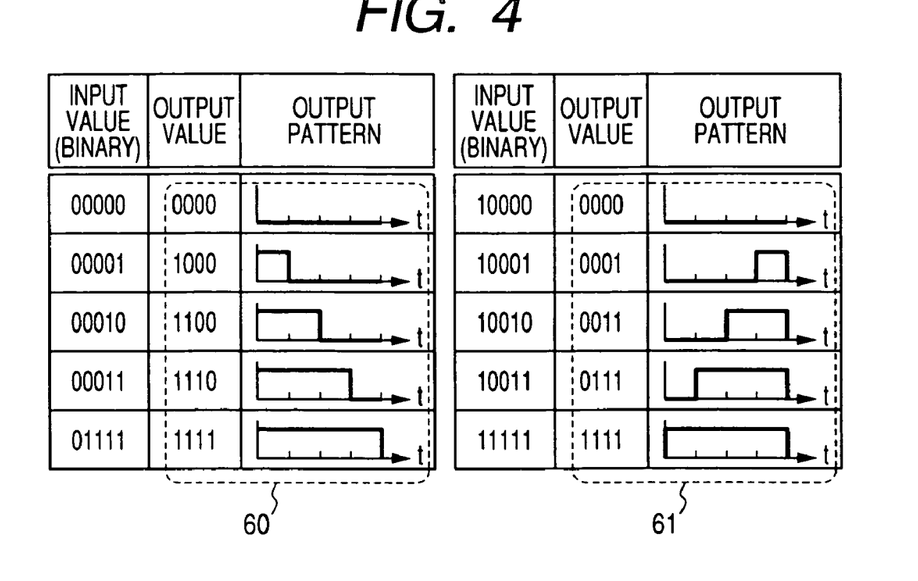
FIG. 4 is a descriptive view showing an example output conversion table.

When $\Delta n<0$ is satisfied, all bits of the output pixel signal are set to 0. When $\Delta n>\Delta h'$ is satisfied, all bits of the output pixel signal are set to 1. In other cases, the output pixel signal $n_o$ is set to satisfy $\Delta n/(2^s)$. Assigning this output gradation value to the output pattern shown in FIG. 4 is most effective. A plurality of embodiments of the present invention will be described hereinbelow by reference to the drawings.

First Embodiment

Figure 1:
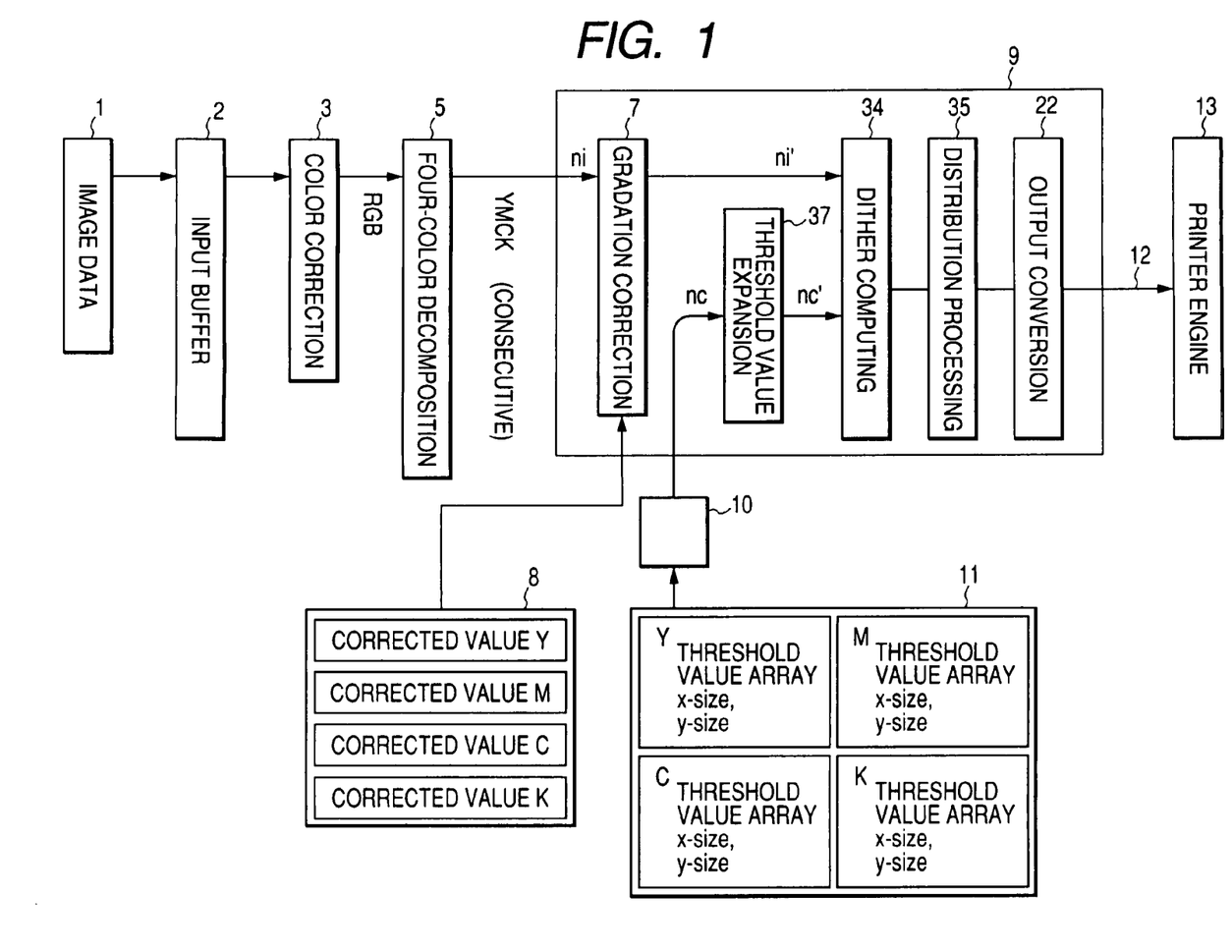
FIG. 1 is a block diagram of an image processing device including a halftoning device according to an embodiment of the present invention.

FIG. 1 shows a block diagram of a color laser printer to which a halftoning device according to a first embodiment of the present invention is applied. This block diagram shows the flow of image processing performed in a color laser printer of 600 dpi.

Image data 1, which are to become an object of printing, are stored in an input buffer 2 as RGB data for one page. In order to perform development of each of KCMY planes (colors), a printer engine 13 repeats processing subsequent to the input buffer 2 four times; namely, four planes of KCMY in connection with a single color image.

A four-color decomposition unit 5, at the outset, performs internal initialization as required such that Black (K) is computed from sequential RGB point data. In response to initialization, a gradation correction unit 7 loads a correction value assigned to Black from a gradation correction value table 8 into an internal reference table. A dither generation unit 10 loads a threshold value array stored in a threshold value array storage assigned to Black and size data pertaining to the threshold value array from a table 11, to thus effect internal initialization. Like a threshold value array 55 shown in FIG. 3, the threshold value array is an array of values represented by 8 bits ranging from 0 to 255.

The RGB data sent from the input buffer 2 undergo color correction performed by a color correction unit 3, generation of Black data performed by the four-color decomposition unit 5, and gradation correction performed by the gradation correction unit 7. Subsequently, the RGB data are output in the form of a PWM signal 12 to the printer engine 13 by a halftoning device 9. The gradation correction unit 7 corrects a gradation value which constitutes a portion of the halftoning device 9 to be described later and which takes, as the maximum value, nmax=(a total number of steps of gradation−1) obtained by setting various setting parameters.

Figure 8:
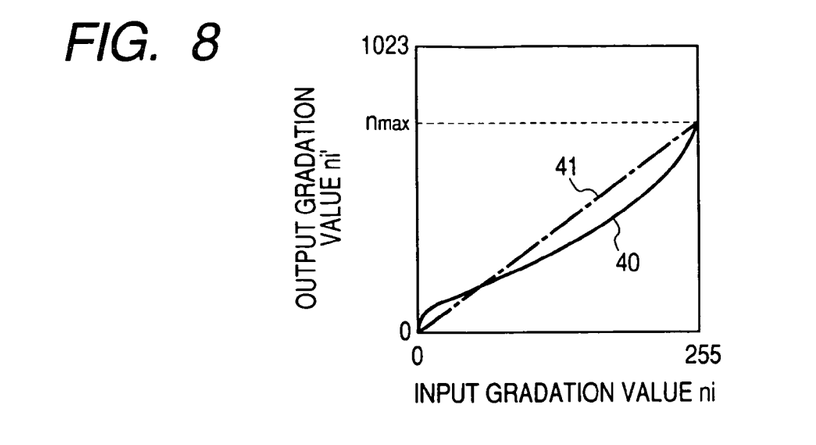
FIG. 8 is a characteristic diagram showing a characteristic of an input-output correspondence relationship of the gradation correction unit.

FIG. 8 shows exemplary correspondence between an input and an output achieved by the gradation correction unit. In this example, an output gradation value assumes a 10-bit range value from 0 to nmax ($\leqq$1023) in response to an input gradation value $n_i$ in the range from 0 to 255. Now, 10-bit range signifies that the maximum value allowed as nmax can be as high as 1023, and nmax may be a value which does not necessarily require 10 bits.

Figure 9:
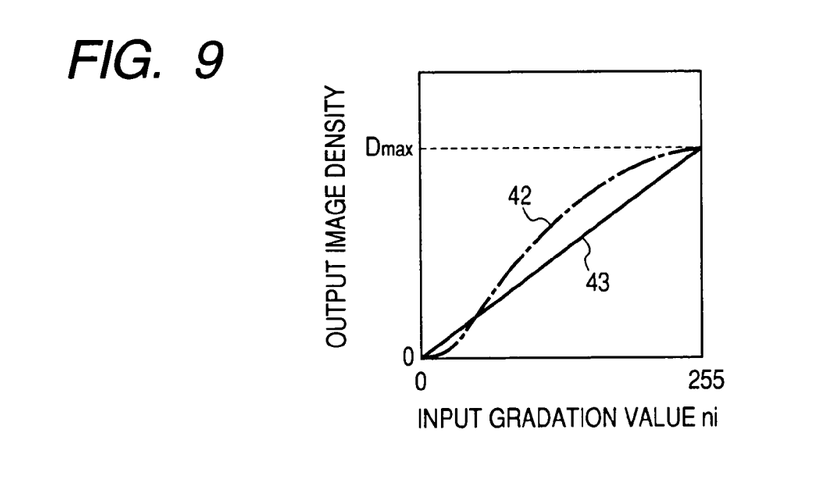
FIG. 9 is a characteristic diagram showing a characteristic of output density correction obtained by gradation correction.

FIG. 9 shows a corrected characteristic. In a case where a density characteristic of an image output from the printer engine 13 in response to linear correction 41, by which only an input range is matched with an output range, is an original characteristic 42 of a dashed line, a correction curve 40, which is shown in FIG. 8 and corresponds to a reverse characteristic of the original characteristic, is implemented as an input-output relationship of the gradation correction unit 7 (by reference to, e.g., a lookup table). Thereby, a linear density characteristic indicated by the corrected characteristic 43 shown in FIG. 9 can be obtained.

As a matter of course, an arbitrary density characteristic other than the above characteristic can be readily obtained by generating a target characteristic from the correction curve 40.

After processing for one page of Black has been completed, the four-color decomposition unit 5, the gradation correction unit 7, and the dither circuit 10 re-load respective required parameters for Cyan, such as threshold value arrays or the like, to thus perform initialization. The PWM signal 12 for one page of Cyan is delivered to the printer engine 13 through analogous processing. Likewise, processing for Magenta and Yellow is performed. Switching among these color planes is performed in synchronism with a vertical synchronization signal of the printer engine.

Flows of processing shown in FIG. 1 are presumed on image processing performed by a color laser printer called a four rotary type which develops CMYK planes one at a time. However, even in the case of image processing of tandem type where development units for respective CMYK colors are provided and four colors are developed in an essentially-concurrent manner, processing from the gradation correction unit 7 to the halftoning device 9 is analogous.

Figure 2:
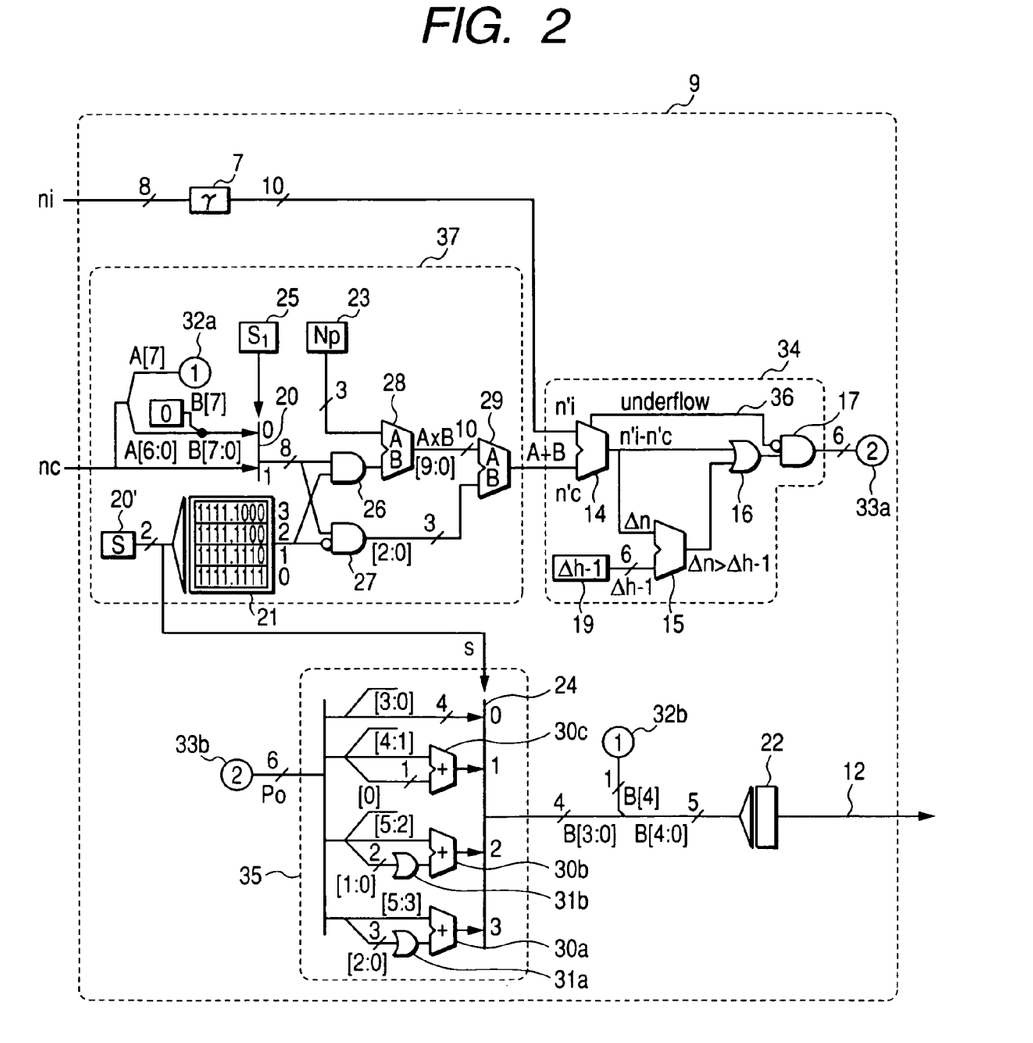
FIG. 2 is a detailed block diagram of the halftoning device.

FIG. 2 is a block diagram of the halftoning device according to the embodiment. In the drawing, symbol [b:a] denotes a partial signal pertaining to a (b−a+1) bit from a-th to b-th, where signal lines are numbered from 0 in sequence of a signal line of the lowest bit to a signal line of a higher-order bit. For instance, a signal of [3:0] assigned to a binary value of (00001011) is (1011), which are the lower four bits. [3:1] denotes (101) of the higher-order three bits of [3:0].

First, the configuration and function of a threshold value expansion unit 37 in the halftoning device 9 will be described. A node 32*a* connects a signal line of the highest-order bit of the threshold value $n_c$ to a signal line of a node 32*b*. The highest-order bit of the threshold value $n_c$ is utilized as an output pattern switching flag which is to be combined with an output conversion table 22 to be described later. A node 33*a* is connected to a signal line of a node 33*b*.

A register 25 stores a one bit value s1. As to s1, s1 is set to 0 when the highest-order bit of $n_c$ is utilized as an output pattern switching flag. If not, s1 is set to one.

A register 23 (second register) stores a 3-bit value Np. Np denotes the number of switching steps of density of one dot (i.e., a value determined by subtracting one from the number of steps of gradation). For instance, when one dot is divided into four sub-divisions by PWM, Np is set to four.

A register 20' stores 2-bit value s. Reference symbol s denotes the amount of bit shift adopted in U.S. Pat. No. 6,191,868; namely, the number of bits, among the threshold value $n_c$, used for distribution processing.

A register 19 (first register) stores a 6-bit value $\Delta h'=(\Delta h-1)$. $\Delta h$ denotes an interval between expanded threshold values $n_c'$, which will be described later.

The following relationship exists between the values of the registers and the number of dots constituting a basic threshold value pattern to be described later (the number of basic threshold values); namely, the number of distributions=2^s, $\Delta h$=(the number of distributions)×Np, and a total number of steps of gradation=(the number of basic threshold values)×$\Delta h$+1, where 2^s denotes 2 to the s power.

In accordance with a value s1 of the register 25, the selection unit 20 selects a value, which has been obtained by replacing the highest-order bit of the threshold value $n_c$ with 0 in the case of s1=0. In the case of s1=1, the value of the threshold value $n_c$ is selected in unmodified form thereof, and the thus-selected value is output.

A mask table 21 stores four 8-bit masks. In response to the set value s in the register 20', a value of (11111111) is output in the case of s=0; a value of (11111110) is output in the case of s=1; a value of (11111100) is output in the case of s=2; and a value of (11111000) is output in the case of s=3. However, numerals in parentheses are binary expressions.

An AND circuit 26 receives as inputs a value (of 8 bits) output from the selection unit 20 and a value (of 8 bits) output from a mask table 21; and outputs a logical AND product of the output values (a product for each bit).

An AND circuit 27 receives, as an input, a value (of eight bits) which is determined by inverting 0 and 1 in bits of the value (of eight bits) output from the selection unit 20 and in bits of a value output from the mask table 21; and outputs lower three bits of a logical product of the inverted values.

A multiplication unit 28 receives, as inputs, a value Np (of three bits) of the register 23 and an output (of eight bits) from the AND circuit 26; and outputs lower 10 bits of 11 bits of the result of multiplication. If the value of Np is limited to 2^i type (i=0, 1, 2, 3), the multiplication unit 28 can be implemented as a mere bit shift. In this case, there is yielded an advantage of a small logic scale.

An addition unit 29 receives, as inputs, a value (of 10 bits) output from the multiplication unit 28 and a value (of three bits) output from the AND circuit 27; and outputs a value (of 10 bits) obtained by adding these values together. Arithmetic operation of the addition unit 29 originally involves mere merging of the values decomposed by the mask table 21 and the AND circuits 26, 27. Carrying-over does not arise, and the output value assumes a value of 10 bits. Consequently, rather than being implemented by additional operation which takes into consideration of ordinary carrying-over, the addition unit 29 can be implemented by merging lower-order three bits of the 10-bit input value to an OR value of the three-bit input.

Thus, the threshold value expansion unit 37 takes an 8-bit threshold value $n_c$ as an input value; and outputs a 10-bit expanded threshold value $n_c'$ which has been obtained by multiplying only higher-order (8-s) bits by Np while taking lower-order s bits of $n_c$ unmodified.

Next will be described the configuration of a dither computing unit. A dither computing unit 34 receives, as inputs, a corrected gradation value $n_t'$ associated with the 10-bit value by the gradation correction unit 7 and an expanded threshold value $n_c'$ expanded by 10 bits by the threshold value expansion unit 37; and outputs a 6-bit value obtained by the following configuration.

A subtraction unit 14 receives, as inputs, a corrected gradation value $n_t'$ (of 10 bits) and an expanded threshold value $n_c'$ (of 10 bits) which is a value output from the addition unit 29; and outputs a subtracted value $\Delta n = n_t' - n_c'$ (of 10 bits) and an underflow signal 36 (of one bit). In the case of $\Delta n < 0$, the underflow signal 36 assumes a value of 1. In the case of $\Delta n \geqq 0$, the underflow signal 36 assumes a value of 0. Logical values (0, 1) of the underflow signal are inverted and input to AND circuit 17.

A comparison unit 15 receives, as inputs an output $\Delta n$ (of 10 bits) from the subtraction unit 14 and a value $\Delta h-1$ (of six bits) from the register. In the case of $\Delta n > \Delta h-1$, the comparison unit 15 outputs a one-bit value of 1. In the case of $\Delta n \leqq \Delta h-1$, the comparison unit 15 outputs a one-bit value of 0. An OR circuit 16 receives, as inputs, a value (of one bit) output from the comparison unit 15 and a value $\Delta n$ (of 10 bits) output from the subtraction circuit 14. In a case where the output from the comparison unit 15 assumes a value of 0, lower-order six bits of $\Delta n$ are output in an unmodified form. When the output from the comparison unit 15 assumes a value of 1, the comparison unit 15 outputs a (binary) value of (111111).

The AND circuit 17 receives, as input values, a logically-inverted value (of one bit) of the underflow signal 36 and a value (of six bits) output from the OR circuit 16. When the underflow signal 36 assumes a value of 1 (an inverted value thereof is 0), the AND circuit 17 outputs a (binary) value of (000000). When the underflow signal 36 assumes a value of 0 (an inverted value thereof is 1), the value (of six bits) output from the OR circuit 16 is output in unmodified form.

The dither computing unit 34 receives, as input values, a corrected gradation value $n_t'$ (of ten bits) and an expanded threshold value $n_c'$ (of 10 bits). In relation to $\Delta n = n_t' - n_c'$ (of 10 bits) and $\Delta h' = \Delta h - 1$ (of six bits), the dither computing unit 34 outputs a value of (000000) in the case of $\Delta n < 0$. If $\Delta n > \Delta h'$, the dither computing unit 34 outputs a value of (111111). In other cases ($0 \leqq \Delta n \leqq \Delta h'$), the dither computing unit outputs lower-order six bits of $\Delta n$.

The configuration of the distribution processing unit will now be described. In a distribution processing unit 35, an OR circuit 31a receives, as an input value, lower-order three bits of an output (of six bits) from the dither computing unit 34. If the input value is not zero, a one-bit value of 1 is output. If the input value is zero, a one-bit value of 0 is output.

An OR circuit 31b receives, as an input value, lower-order two bits of the output (of six bits) from the dither computing unit 34. If the input value is not zero, a one-bit value of 1 is output. If the input value is zero, a one-bit value of 0 is output.

An addition unit 30a receives, as input values, middle-order 3 bits [5:3] of the output (of six bits) from the dither computing unit 34 and the value (of one bit) output from the OR circuit 31a; and outputs an added value (of four bits) consisting of these input values.

An addition unit 30b receives, as input values, middle-order four bits [5:2] of the output (of six bits) output from the dither computing unit 34 and the value (of one bit) output from the OR circuit 31b; and outputs an added value (of four bits) consisting of these input values. When a 4-bit value of the middle-order value [5:2] assumes (binary) (1111), the output value is saturated; carrying-over induced by addition is not performed; and a value of (1111) is output.

An addition unit 30c receives, as input values, a middle order 4 bits [4:1] and a lowest-order one bit, both belonging to the output (of six bits) from the dither computing unit 34; and outputs an added value (of four bits) consisting of these input values. When the middle-order 4 bits [4:1] assumes a value of (binary) (1111), the output value is saturated, and an output (1111) is produced without performing carrying-over operation caused by addition.

In accordance with a preset value s of the register 20', selection unit 24 selects lower-order 4 bits of the output (of six bits) from the dither computing unit 34 in the case of s=0. The selection unit 24 selects and sends an output (of four bits) from the addition unit 30c in the case of s=1; selects and sends an output (of four bits) from the addition unit 30b in the case of s=2; and selects and sends an output (of four bits) from the addition unit 30a in the case of s=3.

The output conversion table 22 receives, as an input, a 5-bit value which is determined by adding the highest-order one bit of the threshold value $n_c$ extracted by the node 32a to a high level of the value (of four bits) output from the selection unit 24. By reference to a table, a corresponding 4-bit value is output.

Figure 5:
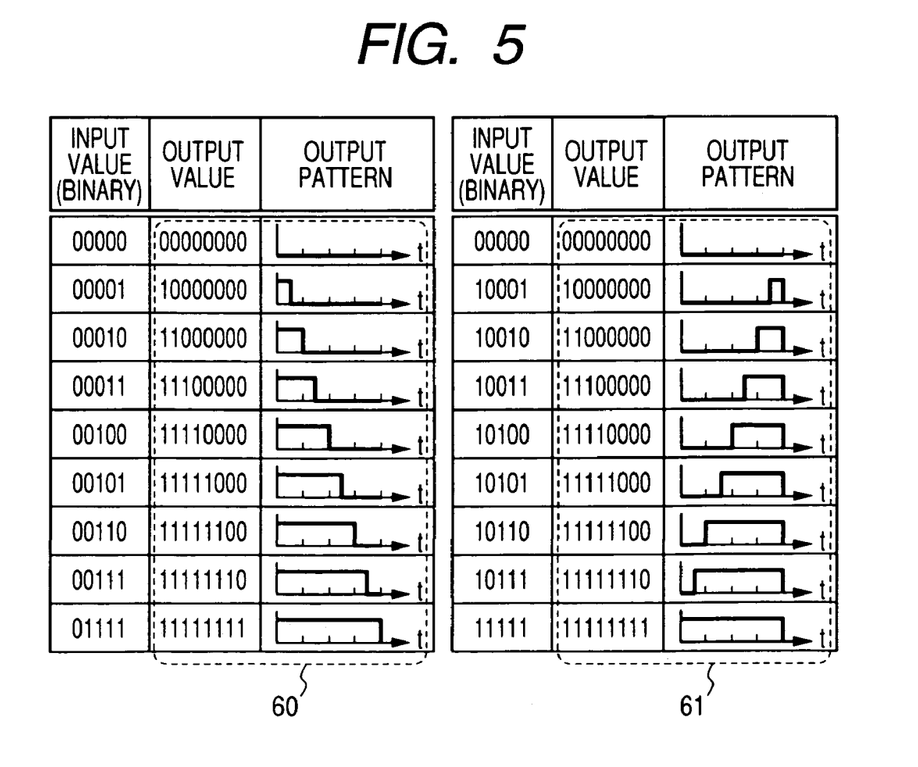
FIG. 5 is a descriptive view showing another example output conversion table.

FIGS. 4 and 5 show an example input-and-output relationship of the output conversion table. FIG. 4 shows a case where the number Np of subdivisions made by PWM is four. FIG. 5 shows a case where the number Np of subdivisions made by PWM is eight. In FIGS. 4 and 5, input and output values are expressed in binary, and pulse patterns corresponding to output values are conceptually drawn with the horizontal axis being taken as a time axis and the vertical axis being taken as representing pulse intensity.

When a laser beam is caused to perform a scan from left to right, a right growth pattern 60 shown in FIGS. 4, 5 corresponds to an exposure signal pattern where a dot grows from left to right with an increase in density and which changes from an ON state to an OFF state. A left growth pattern 61 corresponds to an exposure signal pattern where a dot grows from right to left with an increase in density and which changes from an OFF state to an ON state. Especially, when the highest-order bit of the input value is zero, the right growth pattern 60 is assigned. When the highest-order bit of the input value is one, the left growth pattern 61 is assigned.

Figure 3:
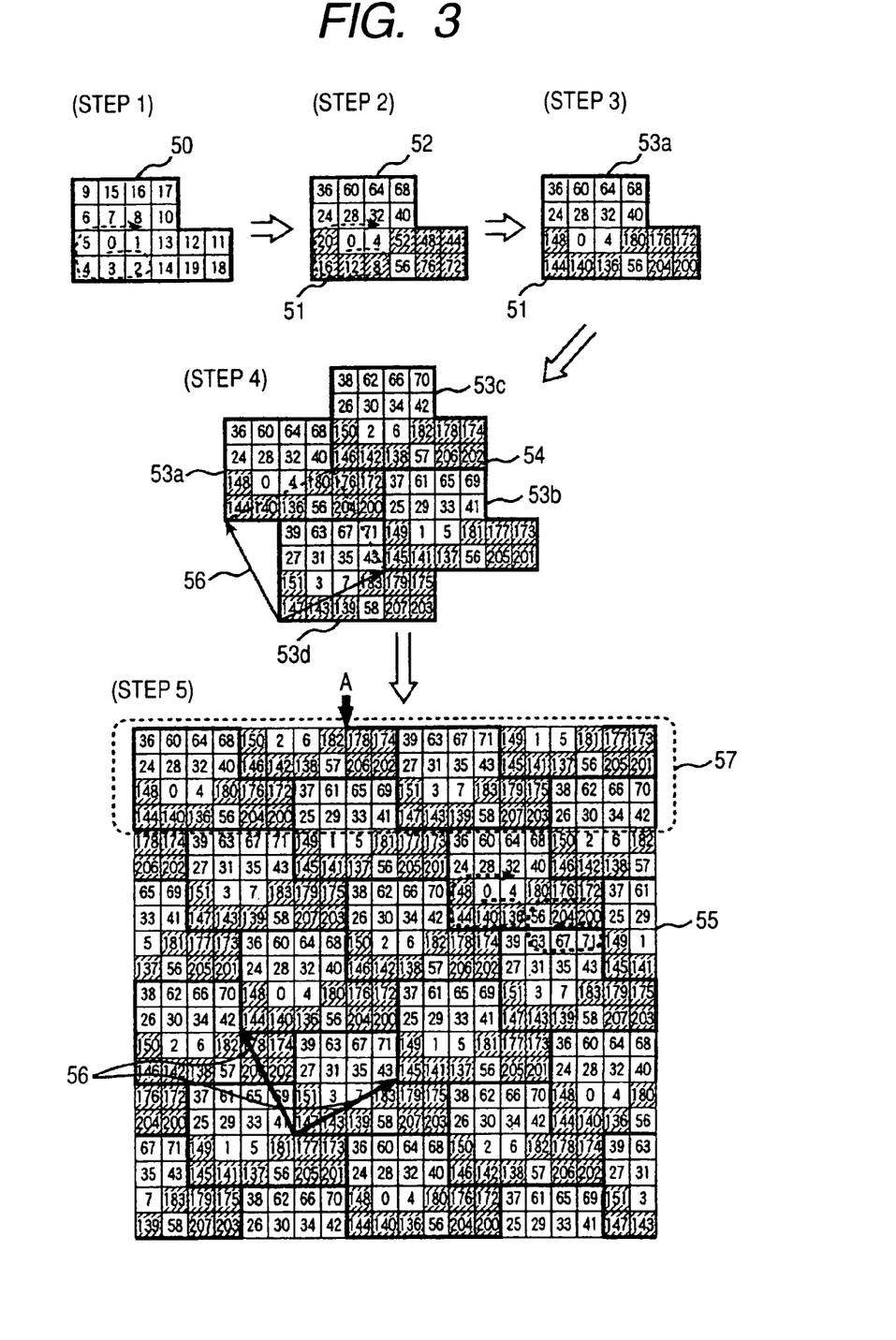
FIG. 3 is a procedure diagram of a method for forming a threshold value array applied to the halftoning device.

FIG. 3 shows an example method for forming a threshold value array which enables effective halftoning by a combination with the halftoning device 9 shown in FIG. 2.

In (Step 1), as indicated by a basic threshold value pattern 50 shown in FIG. 3, there is formed a pattern which shows the sequence of points, which are to be printed with an increase in an input gradation value $n_i$, from zero. In the example of the basic threshold value pattern 50 shown in FIG. 3, as indicated by a broken arrow on the basic threshold value pattern 50, the pattern forms a clustered-dot which starts to grow clockwise from zero, which is a start of point, in a helical manner.

In (Step 2), there is formed a threshold value pattern 52 into which elements of the basic threshold value pattern 50 are multiplied by $2^s$. An example threshold pattern 52 is presumed on s=2.

In (Step 3), in order to switch the growth pattern of PWM by utilization of the highest-order bit of the threshold value, 128 is added to respective elements of an shadow portion 51 of the threshold value pattern 52, to thus generate a threshold value pattern 53a. Switching of the growth pattern of PWM is implemented by combinations of settings of the output conversion table 22 shown in FIG. 6 which will be described later. Implementation of switching is based on the premise that the highest-order bit of the elements of the threshold value pattern 52 assumes a value of 0; i.e., 127 or less. This premise is fulfilled, so long as the number of constituent elements of the basic threshold value pattern 50 is $128/(2^s)$ or less. For instance, in the case of s=2, the premise for use of a flag bit can be fulfilled, so long as the basic threshold value pattern 50 is formed from 32 elements or less.

In (Step 4), on the basis of the threshold value pattern 53a, a threshold value pattern 53b formed by adding one to respective elements of the threshold value pattern 53a, a threshold value pattern 53c formed by adding two to respective elements of the threshold value pattern 53a, and a threshold value pattern 53d formed by adding three to respective elements of the threshold value pattern 53a are generated. These patterns are combined with each other in accordance with a displacement vector 56 [(4,2), (−2,4), and their sum], to thus form an expanded threshold value pattern 54.

As a result, when a corrected input gradation value $n_i'$ is incremented by one, distribution is effected in sequence of 53a, 53b, 53c, and 53d as in the case of FIG. 9 provided in U.S. Pat. No. 6,191,868. Thus, the density of a clustered-dot to be printed is increased.

In (Step 5), a rectangular area, which is periodically closed with respect to rows and columns, cut out of the array where the expanded threshold value 54 is repeated, to thus obtain the threshold value array 55.

The dither generation unit 10 shown in FIG. 1 periodically, repetitively utilizes the threshold value array 55, by use of information about the size of the threshold value array 55; and supplies a threshold value $n_c$ to the halftoning device 9.

Similar to the case of an example disclosed in FIG. 8 of U.S. Pat. No. 6,191,868, the threshold value array 55 can also be used while the size thereof is being saved, by repetitively utilizing a partial array indicated by a broken line 57 such that the partial array is displaced in a position indicated by arrow A.

In this case, in addition to information about the size of the array, the dither generation unit 10 shown in FIG. 1 manages an address of a threshold value, which would be equivalent to repetitive utilization of the threshold value array 55, in the partial threshold value array indicated by the broken line 57, by use of information about the position indicated by arrow A.

In relation to the thus-configured threshold value array, the setting values of the respective registers in the halftoning device 9 shown in FIG. 2 are set such that Np=4, s=2, Δh=16 (=Np×$2^s$), and s1=0. As a result, there is implemented halftoning, wherein the number of PWM steps Np (=4), the number of distributions=$2^s$ (=4), (the maximum gradation value) =(the number of basic threshold values)×Δh=20×16=320, and (a total number of steps of gradation)=(the maximum gradation value)+1=321.

As a matter of course, the above-described configuration method of (Step 1) to (Step 5) is applicable to any shape other than the basic threshold value pattern 50 shown in FIG. 3.

Figure 6:
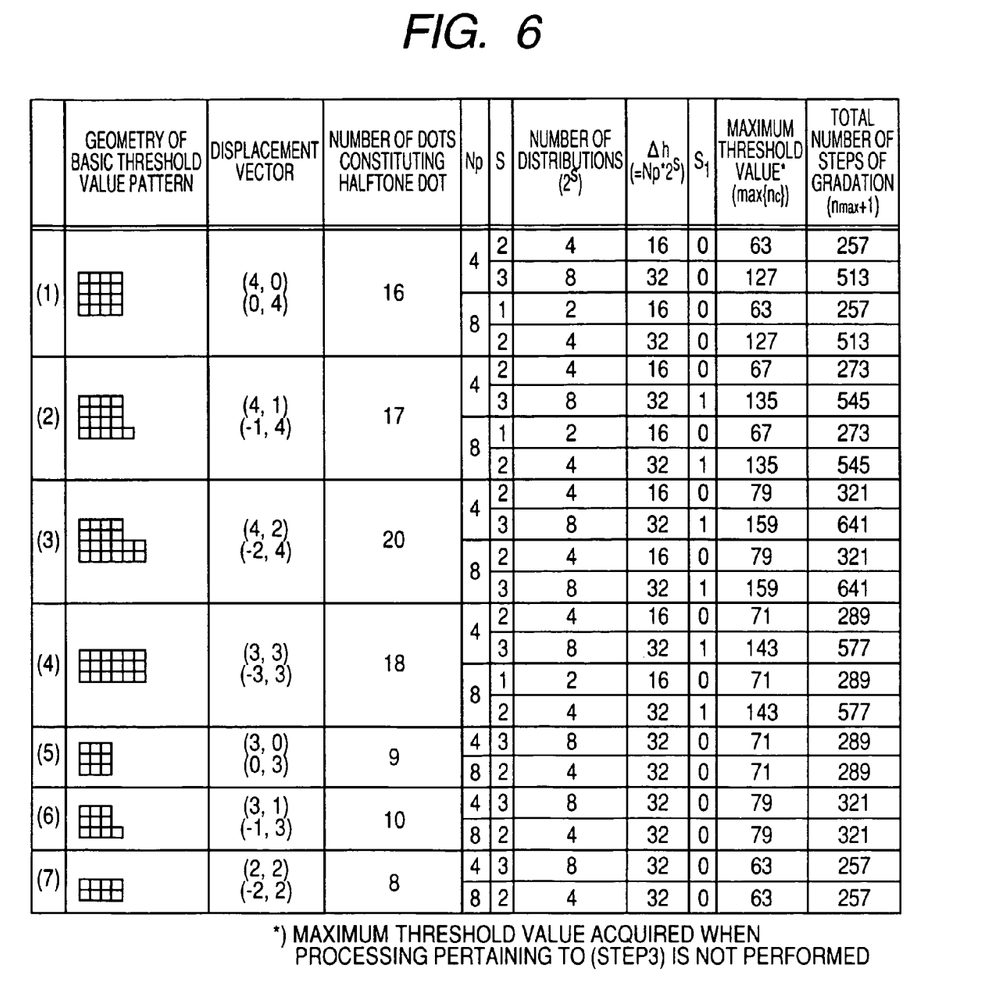
FIG. 6 is a descriptive view showing example setting pertaining to the geometry of a basic threshold value pattern and parameters for respective registers.

FIG. 6 shows the geometry of the basic threshold value pattern including the example shown in FIG. 3 and example setting values of the registers which can be applied to respective cases. The register 19 stores the value of Δh in FIG. 6 as a value of Δh−1, thereby effectively utilizing the number of bits in the register 19.

The maximum threshold value in FIG. 6 is the maximum value that is determined by removing the addition (addition of 128) from the highest bit of the threshold value in (Step 3) shown in FIG. 3. Accordingly, in a case where the maximum threshold value in FIG. 6 becomes 128 or more, if processing pertaining to (Step 3) in FIG. 3 is performed, carrying-over will arise. In such a case, processing pertaining to (Step 3) is omitted, and the register 19 is used with the value s1=1 of the register 25 in FIG. 2.

In this case, difficulty is encountered in arranging the right growth pattern 61 and the left growth pattern 60 in the output conversion table shown in FIG. 4 while maintaining a match with the array of the threshold values (Step 3). Accordingly, adjustment is performed so as to achieve smooth-possible continuity between the texture and density gradation of clustered-dots, by, e.g., reviewing the array relationship of the threshold values and the pattern table, making the right growth pattern 61 identical with the left growth pattern 60, and the like.

The previous example shown in FIG. 3 corresponds to an example first row in (3) of FIG. 6. As shown in (3) of FIG. 6, in relation to the geometry of a basic threshold value pattern shown in FIG. 3, there can be performed halftoning of (a total number of steps of gradation)=641 determined by settings of Np=4, s=3 (the number of distributions is eight) or Np=8, s=2 (the number of distributions is four), which are employed as setting values for another register. However, in these cases, the maximum threshold value comes to 128 or more as mentioned previously. Hence, the halftoning device 9 uses the value s1 of the register 25 as s1=1.

As a matter of course, the case of Np=8 is based on the premise that hardware (an exposure controller) is compatible with eight output levels (nine steps of gradation including a white background or a solid). In compliance with the premise, the output conversion table 22 shown in FIG. 2 is also made compatible with the pulse pattern of eight steps shown in FIG. 5.

In addition, the case of Np=3 can be addressed by use of an exposure controller compatible with three steps of outputs (four steps of gradation) and an output conversion table 255.

Figure 7:
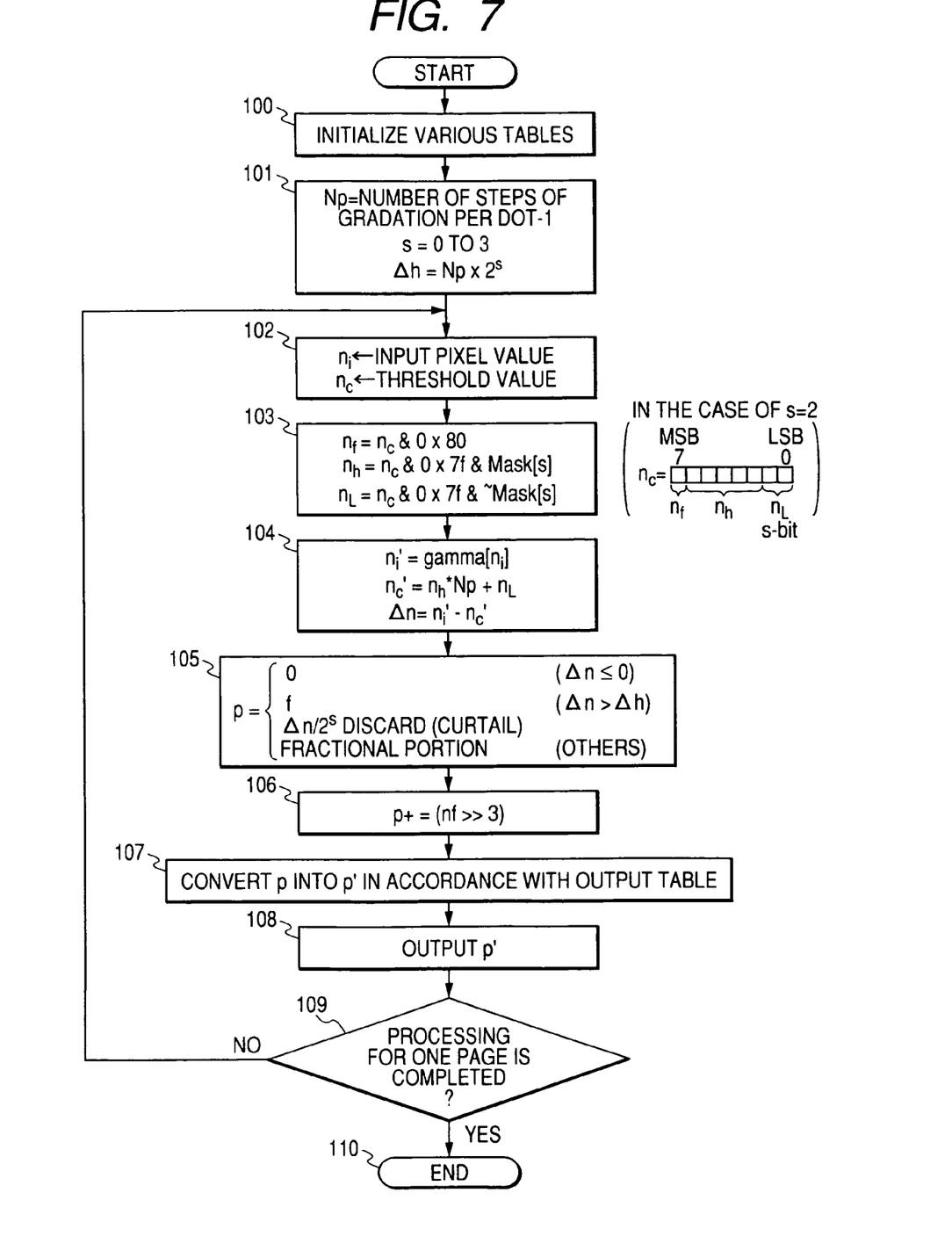
FIG. 7 is a flowchart showing procedures of halftoning according to the embodiment of the present invention.

FIG. 7 shows a flowchart adopted when the halftoning method according to an embodiment of the present invention is implemented by software.

When processing is commenced, various types of tables, such as a γ table (Gamma), an output conversion table, a mask table (Mask), and a dither threshold value array ($n_c$), are set.

The dither threshold value array is a threshold value array (e.g., a threshold value array 55) that is obtained from the basic threshold value pattern geometry as shown in FIG. 6, by use of the method indicated in steps 1 to 5 in FIG. 3. As shown in FIG. 8, the γ table is a table where the range of a total number of steps of gradation in the threshold value array is matched with the output range. The mask table Mask is a table where Mask[0]=(11111111), Mask[1]=(11111110), Mask

[2]=(11111100), and Mask[3]=(11111000) are obtained on condition that numerals in parentheses is in decimal.

In step 101, (the number of steps of gradation per pixel-1) is set for Np; the number of distributed bits is set for s; and Np×(2^s) is set for Δh. In accordance with a combination, such as that shown in FIG. 6, these values are set in compliance with the dither threshold value set in step 100. For example, when setting is made in compliance with the threshold value array 55 shown in FIG. 3, Np=4, s=2, and Δh=16 are set.

Processing pertaining to step 102 to step 109 is repeated by an amount corresponding t array elements $n_i=n_i[i][j]$ of the respective input pixel values for one page.

In step 102, the first (next) input pixel value (an 8-bit value) is input in connection with $n_i$, and an element value of the first (next) threshold value array is input in connection with $n_c$. In normal times, $n_i$ and $n_c$ are values referred by a two-dimensional array of 8-bit values. Provided that the array size of $n_c$ is (xsize)×(ysize), a threshold value $n_c$ to be compared with (i,j) elements $n_i=n_i[i][j]$ of an input pixel is repeatedly utilized by selecting an element (i%xsize, j%ysize) element of $n_c$ and $n_c=n_c[i\%xize][j\%ysize]$ (symbol n%p is a remainder obtained when "n" is divided by "p").

In step 103, $n_f=n_c$ & (1000000), $n_h=n_c$ & (01111111) &Mask[s], $nL=n_c$ & (10000000)& Mask[s] are assumed to be obtained, where symbol & denotes AND operation for each bit; denotes inversion of 0, 1 for each bit; and value in a parentheses is a binary.

In step 104, $n_i'=Gamma[n_i]$, $n_c'=n_h \times Np+nL$, $\Delta n=n_i'-n_c'$ is assumed to be obtained.

In step 105, a 4-bit value p is set in accordance with the value of Δn such that p=0 is achieved in the case of Δn<0; such that p=(1111) is achieved in the case of Δn≧Δh; and such that p=Δn/2^s (a fractional portion is curtailed) is achieved in the case of 0<Δn<Δh.

In step 106, $n_f$>>3 (a value obtained by shifting $n_f$ rightward by three bits) is added to p.

In step 107, p is converted into an output value p' in accordance with the output conversion table 22, and the output value is output in step 108.

In step 109, processing pertaining to steps 102 to 108 is repeated until the input pixel $n_i$ for one page is completed. After processing for one page has been completed, processing is completed.

Even when a fractional portion of p=Δn/2^s in step 105 is discarded as described in U.S. Pat. No. 6,191,868, a similar advantage is yielded.

Figure 10:
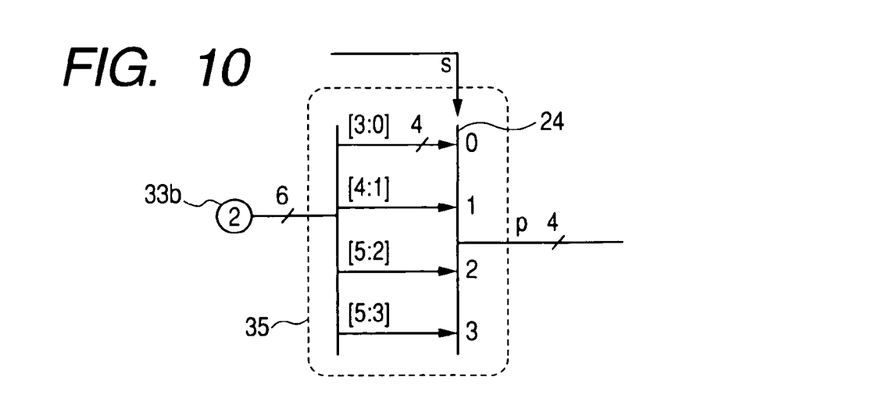
FIG. 10 is a block diagram of a distribution processing unit according to another example.

FIG. 10 shows the distribution processing unit 35 in the halftoning device 9 corresponding to discarding operation. The distribution processing unit is implemented by omitting the addition unit and providing simple means which selects a signal line for four bits from a 6-bit signal of the node 33b. Since a selection signal corresponding to s=3 is three bits of [5:3], a signal of 0 is added to the highest bit to thus generate four bits.

The embodiment shown in FIGS. 3 and 4 has described a method for utilizing the highest bit of the threshold value $n_c$ for switching of a growth direction of PWM. However, when the development unit (not shown) in the printer engine unit is an LED array head, one pixel is made multivalue by controlling exposure intensity.

Figure 12:
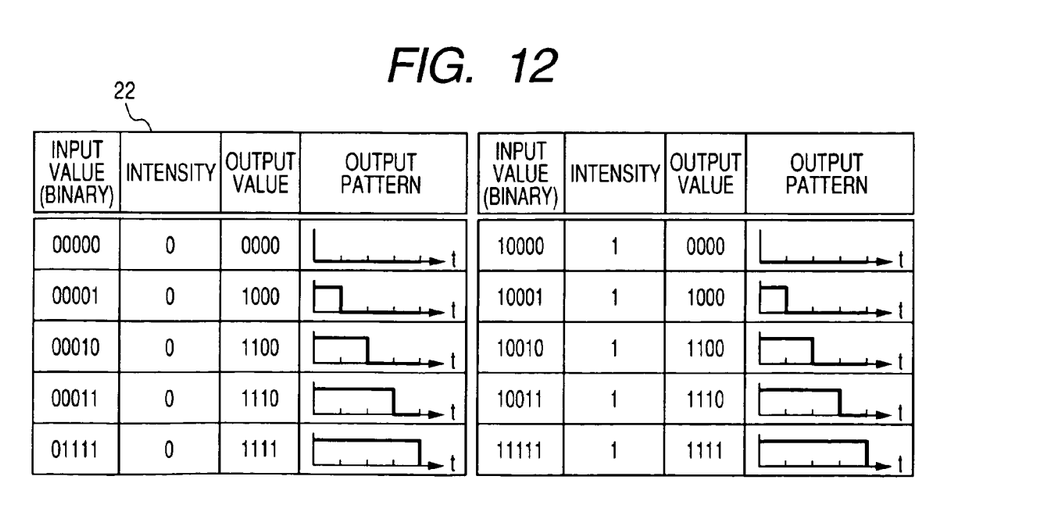
FIG. 12 is a descriptive view of an output conversion table employed when exposure intensity is modulated.

FIG. 12 is an example of an output conversion table in another embodiment. When an exposure control unit of the printer engine unit controls exposure intensity by a duration of an input signal and the intensity of the input signal, an output conversion table such as that illustrated can be utilized.

In FIG. 12, in response to a 5-bit input of the output conversion table, the highest-order bit is assigned to output signal intensity, and lower four bits are assigned to a signal output time. When the output signal intensity bit is one, signal intensity is set so as to become lower than that acquired in normal times.

Figure 11:
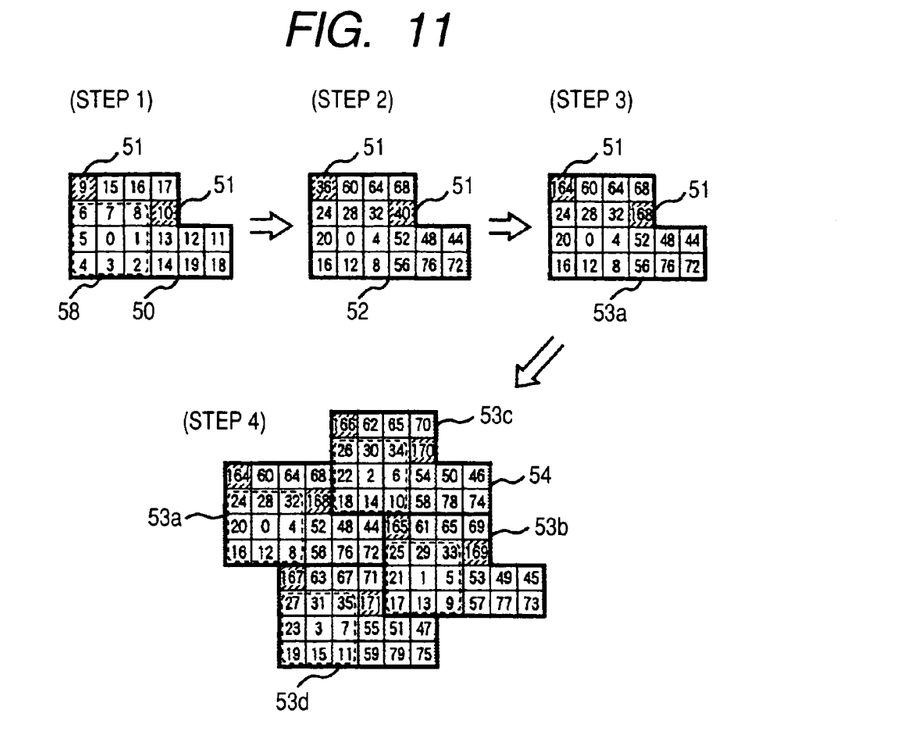
FIG. 11 is a procedure diagram of the threshold value array method adopted when exposure intensity is modulated.
Figure 13:
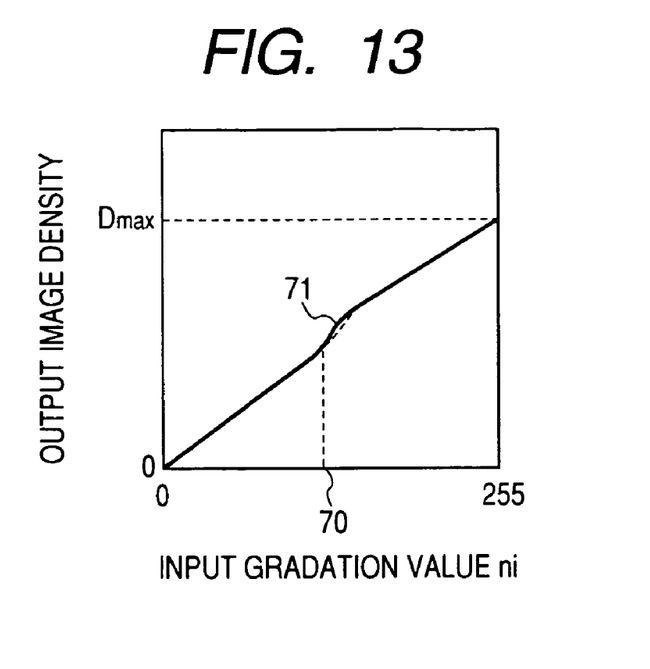
FIG. 13 is a characteristic diagram showing an example sudden change in density induced by a chained dot.

FIG. 11 shows another example method for forming a dither threshold value pattern. As illustrated, a clustered-dot portion 58 of the basic threshold value pattern 50 adds 128 to the highest-order bit of the threshold value element in relation to the pixel 51 first coupled to the clustered-dot portion 58 which is adjacent to the pixel during expansion (Step 3). A sudden change in a density characteristic can be lessened. FIG. 13 shows a density characteristic achieved in such a case. Occurrence of a sudden change portion 71 in the density characteristic of a gradation value 70 where clustered-dots are chained (a chained dot arises) is lessened.

Figure 14:
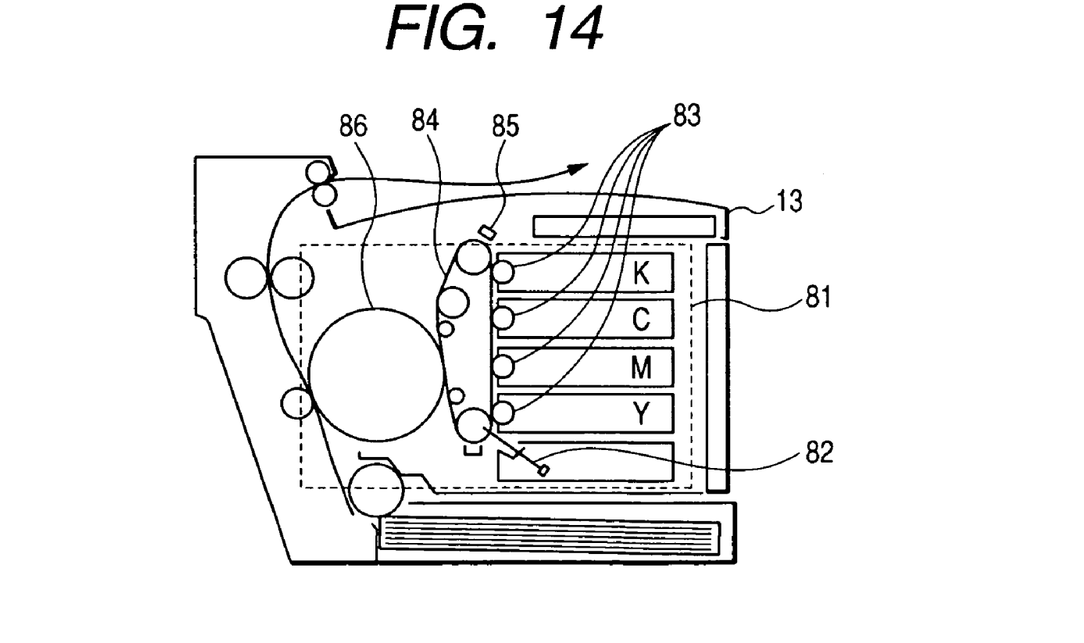
FIG. 14 is a schematic diagram of a laser printer.

FIG. 14 is a color laser printer equipped with a halftoning device of the present invention. In the printer engine 13, a printer controller 81 equipped with an image processor, which includes the halftoning device of the present invention, is attached to a side position of an enclosure.

The printer engine 13 adopts a system which forms an electrostatic latent image on a photosensitive element 84 by a laser 82, develops an electrostatic latent image on the photosensitive element 84 by a coloring agent (toner) electrified by a development unit 83, and transfers the electrostatic latent image onto an intermediate transfer element 86. Although illustrated in a simple manner, a laser optical system 82 causes a laser to make a scan by rotation of a polygon mirror while taking a direction orthogonal to a direction—in which the photosensitive element 84 is fed (from down to top in the drawing)—as a main scanning direction.

Although not illustrated particularly, an exposure time control unit for associating a value output from the output conversion table 22 with a pulse pattern and an exposure intensity control unit for switching the pulse intensity of the laser in two steps are mounted in the printer controller 81.

The present invention enables implementation of a halftoning device which effects conversion for expressing n-bit gradation by combinations of a plurality of pixels in relation to a raster image output device which is difficult to effect n-bit gradation expression (n is usually eight) by one pixel. Thus, the present invention can be widely applied to a printer, a copier, and a facsimile.

The entire disclosure of Japanese Patent Application No. 2005-241243 filed on Aug. 23, 2005 including specification, claims, drawings and abstract is incorporated herein by reference in its entirety.

What is claimed is:

1. A halftoning device that converts an input pixel signal of 8 bits per pixel into an output pixel signal of r bits per pixel, wherein r is less than 8, the halftoning device comprising:
   a threshold value array storage that stores a threshold value array comprising a threshold value of 8 bits ranging from 0 to 255, where a memory area of 8 bits depth is used:
   a threshold value expansion unit that expands the threshold value of 8 bits to an expanded threshold value of n bits per pixel by multiplying higher-order (8-s) bits of the threshold value by a scaling factor Np while maintaining lower-order s bits of the threshold value; and
   a gradation correction unit that expands the input pixel signal into an expanded pixel signal of n bits per pixel, wherein n is greater than 8 and that matches a range of an output value with a range of the expanded threshold value,
   wherein s is an integer, wherein Δn is a difference value between the expanded pixel signal and the expanded threshold value corresponding to the threshold value that is selected for each input pixel signal, wherein Δh' varies in relation to a value of s, and wherein:
when Δn<0 is satisfied, all bits of the output pixel signal are set to 0,
when Δn>Δh' is satisfied, all bits of the output pixel signal are set to 1, and
in other cases, the output pixel signal is set to higher-order r bits of the difference value Δn while omitting lower-order s bits.

2. A halftoning device that converts an input pixel signal of 8 bits per pixel into an output pixel signal of r bits per pixel, wherein r is less than 8, the halftoning device comprising:
a gradation correction unit that expands the input pixel signal into an expanded pixel signal of n bits per pixel, wherein n is greater than 8;
a threshold value array storage that stores a threshold value array comprising a threshold value of 8 bits;
a threshold value expansion unit that expands the threshold value of 8 bits to an expanded threshold value of n bits per pixel; and
a first register that stores a constant Δh',
wherein a range of the expanded pixel signal output from the gradation correction unit is matched with a range of the expanded threshold value,
wherein the output pixel signal is set according to a comparison of the expanded pixel signal with the expanded threshold value corresponding to the threshold value that is selected for each input pixel signal,
wherein the threshold value expansion unit includes a second register that stores a scaling factor Np for a threshold value,
wherein the constant Δh' satisfies Δh'=Np×(2^s)−1,
wherein s is an integer,
wherein the threshold value expansion unit multiplies a higher-order (n-s) bits of the threshold value by the scaling factor Np while maintaining a lower-order s bits of the threshold value,
wherein, when Δn<0 is satisfied, all bits of the output pixel signal are set to 0,
wherein, when in Δn>Δh' is satisfied, all bits of the output pixel signal are set to 1,
wherein in other cases, the output pixel signal is set to satisfy Δn/(2^s) where a fractional portion is discarded or curtailed, and
wherein Δn is a difference value between the expanded pixel signal and the expanded threshold value corresponding to the threshold value that is selected for each input pixel signal.

3. The halftoning device according to claim 2, wherein the constant Δh'=Np×(2^s) is used instead of the constant Δh'=Np×(2^s)−1.

4. The halftoning device according to claim 2, wherein the integer s is the number of lower-order bits of the threshold value and the number of the integer s is in a range from 0 to 3 and is variable.

5. A halftoning method for converting an input pixel signal of 8 bits per pixel into an output pixel signal of r bits per pixel, wherein r is less than 8, the halftoning method comprising:
expanding the input pixel signal into an expanded pixel signal of n bits, wherein n is greater than 8;
storing a threshold value array of 8 bits ranging from 0 to 255, where a memory area of 8 bits depth is used;
expanding a threshold value of 8 bits, from the threshold value array, to an expanded threshold value of n bits and matching a range of the expanded threshold value with a range of the expanded pixel signal; and
setting the output pixel signal according to a comparison of the expanded pixel signal with the expanded threshold value corresponding to the threshold value that is selected for the input pixel signal,
wherein the expanding the threshold value multiplies higher-order (8-s) bits of the threshold value by a scaling factor Np while maintaining lower-order s bits of the threshold value, and
wherein s is an integer,
wherein Δn is a difference value between the expanded pixel signal and the expanded threshold value corresponding to the threshold value that is selected for each input pixel signal,
wherein Δh' comprises a value which varies in relation to a value of s, and
wherein, when Δn<0 is satisfied, all bits of the output pixel signal are set to 0, when Δn>Δh' is satisfied, all bits of the output pixel signal are set to 1, and in other cases, the output pixel signal is set to equal Δn/(2^s) where a fractional portion is discarded or curtailed.

6. A haiftoning method for converting an input pixel signal of 8 bits per pixel into an output pixel signal of r bits per pixel, wherein r is less than 8, the haiftoning method comprising:
expanding the input pixel signal into an expanded pixel signal of n bits, wherein n is greater than 8;
expanding a threshold value of 8 bits to an expanded threshold value of n bits and matching a range of the expanded threshold value with a range of the expanded pixel signal; and
setting the output pixel signal according to a comparison of the expanded pixel signal with the expanded threshold value corresponding to the threshold value that is selected for each input pixel signal,
wherein the threshold value is expanded by multiplying higher-order (n-s) bits of the threshold value by a scaling factor Np while maintaining lower-order s bits of the threshold value,
wherein, when Δn<0 is satisfied, all bits of the output pixel signal are set to 0,
wherein, when Δn>Δh' is satisfied, all bits of the output pixel signal are set to 1,
wherein in other cases the output pixel signal is set to satisfy Δn/(2^s) where a fractional portion is discarded or curtailed,
wherein Δh' is a constant and satisfies Δh'=Np×(2^s)−1,
wherein s is an integer, and
wherein Δn is a difference value between the expanded pixel signal and the expanded threshold value corresponding to the threshold value that is selected for each input pixel signal.

7. The halftoning method according to claim 6, wherein a constant Δh'=Np×(2^s) is used instead of the constant Δh'=Np×(2^s)−1.

8. The halfioning method according to claim 6, wherein the integer s is the number of lower-order bits of the threshold value and the number of the integer s is in a range from 0 to 3 and is variable.

9. A laser printer comprising:
a laser scanning optical system;
an exposure time control unit that subdivides a laser exposure unit time for forming one dot;
an output conversion table that associates a pattern input to the exposure time control unit with an output gradation value;
a first register that stores a value Δh', a gradation correction unit that expands an input pixel signal of 8 bits per pixel into an expanded pixel signal of n bits per pixel, wherein n is 8 or more;

a threshold value array storage that stores a threshold value array comprising a threshold value of 7 bits and additional information of 1 bit associated with an arrangement of the threshold value array as a specific bit, where a memory area of 8 bits depth is used; and a threshold value expansion unit that expands 7 bits other than the specific bit to an expanded threshold value of n bits, wherein an output range of the gradation correction unit is matched with a range of the expanded threshold value, wherein the output gradation value is generated based on the input pixel signal and a difference value $\Delta n$ between the expanded pixel signal and the expanded threshold value corresponding to the threshold value that is selected for the input pixel signal, wherein the output conversion table is switched according to a value of the specific bit, wherein the threshold value expansion unit multiplies higher-order (8-s) bits of the threshold value by a scaling factor Np while maintaining lower-order s bits of the threshold value, wherein s is an integer, wherein $\Delta n$ is a difference value between the expanded pixel signal and the expanded threshold value corresponding to the threshold value that is selected for each input pixel signal, wherein $\Delta h'$ varies in relation to a value of s, and wherein, when $\Delta n<0$ is satisfied, all bits of the output pixel signal are set to 0, when $\Delta n>\Delta h'$ is satisfied, all bits of the output pixel signal are set to 1, and in other cases, the output pixel signal is set to equal $\Delta n/(2^s)$ where a fractional portion is discarded or curtailed.

10. A laser printer comprising:

a laser scanning optical system;

an exposure time control unit that subdivides a laser exposure unit time for forming one dot;

a gradation correction unit that expands an input pixel signal of 8 bits per pixel into an expanded pixel signal of n bits per pixel, wherein n is 8 or more;

a first register that stores a value $\Delta h'$, a threshold value array storage that stores a threshold value array comprising a threshold value of 7 bits and additional information of 1 bit associated with an arrangement of the threshold value array as a specific bit, where a memory area of 8 bits depth is used; and a threshold value expansion unit that expands 7 bits other than the specific bit to an expanded threshold value of n bits, wherein an output range of the gradation correction unit is matched with a range of the expanded threshold value, wherein an output gradation value is generated based on the input pixel signal and a difference value $\Delta n$ between the expanded pixel signal and the expanded threshold value corresponding to the threshold value that is selected for the input pixel signal, wherein a sequence of turning on and off of an output laser pulse is determined according to the additional information of the specific bit, and wherein the threshold value expansion unit multiplies higher-order (8-s) bits of the threshold value by a scaling factor Np while maintaining lower-order s bits of the threshold value, and wherein s is an integer, wherein $\Delta n$ is a difference value between the expanded pixel signal and the expanded threshold value corresponding to the threshold value that is selected for each input pixel signal, wherein $\Delta h'$ varies in relation to a value of s, and wherein, when $\Delta n<0$ is satisfied, all bits of the output pixel signal are set to 0, when $\Delta n>\Delta h'$ is satisfied, all bits of the output pixel signal are set to 1, and in other cases, the output pixel signal is set to satisfy $\Delta n/(2^s)$ where a fractional portion is discarded or curtailed.

11. A laser printer comprising:

an exposure unit;

an exposure time control unit that subdivides a exposure unit time into r, wherein r is an integer;

an exposure intensity control unit that switches an exposure intensity of the exposure unit into a plurality of steps;

a gradation correction unit that expands an input pixel signal of 8 bits per pixel into an expanded pixel signal of n bits per pixel, wherein n is 8 or more;

a first register that stores a value $\Delta h'$, a threshold value array storage that stores a threshold value array comprising a threshold a value of 7 bits and additional information of 1 bit for deciding the exposure intensity of the exposure unit as specific bits. where a memory area of 8 bits depth is used;

a threshold value expansion unit that expands a threshold value of 7 bits other than the specific bits to an expanded threshold value of n bits, wherein the exposure time control unit determines an exposure time based on the input pixel signal and a difference value $\Delta n$ between the expanded pixel signal and the expanded threshold value corresponding to the threshold value that is selected for the input pixel signal, wherein the exposure intensity control unit determines exposure intensity of the exposure unit based on a value of the specific bit, and wherein the threshold value expansion unit multiplies higher-order (8-s) bits of the threshold value by a scaling factor Np while maintaining lower-order s bits of the threshold value, and wherein s is an integer, wherein $\Delta n$ is a difference value between the expanded pixel signal and the expanded threshold value corresponding to the threshold value that is selected for each input pixel signal, wherein $\Delta h'$ varies in relation to a value of s, and wherein, when $\Delta n<0$ is satisfied, all bits of the output pixel signal are set to 0, when $\Delta n>\Delta h'$ is satisfied, all bits of the output pixel signal are set to 1, and in other cases, the output pixel signal is set to equal $\Delta n/(2^s)$ where a fractional portion is discarded or curtailed.

12. The laser printer according to claim 11, wherein the exposure unit includes at least one of a laser optical system and an LED array.

13. A laser printer comprising:

a laser scanning optical system;

an exposure time control unit that subdivides a laser exposure unit time for forming one dot;

an output conversion table that associates a pattern input to the exposure time control unit with an output gradation value;

a gradation correction unit that expands an input pixel signal of 8 bits per pixel into an expanded pixel signal of n bits per pixel, wherein n is 8 or more;

a threshold value array storage that stores a threshold value array comprising a threshold value of 7 bits and additional information of 1 bit associated with an arrangement of the threshold value array as a specific bit; and
a threshold value expansion unit that expands 7 bits other than the specific bit to an expanded threshold value of n bits, wherein an output range of the gradation correction unit is matched with a range of the expanded threshold value,
wherein the output gradation value is generated based on the input pixel signal and a difference value $\Delta n$ between the expanded pixel signal and the expanded threshold value corresponding to the threshold value that is selected for each input pixel signal,
wherein the output conversion table is switched according to a value of the specific bit,
wherein the threshold value expansion unit includes a register that stores a scaling factor Np,
wherein the threshold value expansion unit multiplies a higher-order (n-s) bits of the threshold value by the scaling factor Np while maintaining a lower-order s bits of the threshold value to generate the expanded threshold value,
wherein, when $\Delta n<0$ is satisfied, all bits of, the output pixel signal are set to 0,
wherein, when $\Delta n>\Delta h'$ is satisfied, all bits of the output pixel signal are set to 1,
wherein in other cases the output pixel signal is set to satisfy $\Delta n/(2^s)$ where a fractional portion is discarded or curtailed,
wherein $\Delta h'$ is a constant and satisfies $\Delta h'=Np\times(2^s)-1$, and
wherein $\Delta n$ is a difference value between the expanded pixel signal and the expanded threshold value corresponding to the threshold value that is selected for each input pixel signal.

14. A laser printer comprising:
a laser scanning optical system;
an exposure time control unit that subdivides a laser exposure unit time for forming one dot;
a gradation correction unit that expands an input pixel signal of 8 bits per pixel into an expanded pixel signal of n bits per pixel, wherein n is 8 or more;
a threshold value array storage that stores a threshold value array comprising a threshold value of 7 bits and additional information of 1 bit associated with an arrangement of the threshold value array as a specific bit; and
a threshold value expansion unit that expands 7 bits other than the specific bit to an expanded threshold value of n bits,
wherein an output range of the gradation correction unit is matched with a range of the expanded threshold value,
wherein an output gradation value is generated based on the input pixel signal and a difference value $\Delta n$ between the expanded pixel signal and the expanded threshold value corresponding to the threshold value that is selected for each input pixel signal,
wherein a sequence of turning on and off of an output laser pulse is determined according to the additional information of the specific bit,
wherein the threshold value expansion unit includes a register that stores a scaling factor Np,
wherein the threshold value expansion unit multiplies a higher-order (n-s) bits of the threshold value by the scaling factor Np while maintaining a lower-order s bits of the threshold value to generate the expanded threshold value,
wherein when $\Delta n<0$ is satisfied, all bits of the output pixel signal arc set to 0,
wherein when $\Delta n>\Delta h'$ is satisfied, all bits of the output pixel signal are set to 1,
wherein in other cases the output pixel signal is set to satisfy $\Delta n/(2^s)$ where a fractional portion is discarded or curtailed,
wherein $\Delta n>\Delta h'$ is a constant and satisfies $\Delta h'=Np\times(2^s)-1$, and
wherein $\Delta n$ is a difference value between the expanded pixel signal and the expanded threshold value corresponding to the threshold value that is selected for each input pixel signal.

15. A laser printer comprising:
an exposure unit;
an exposure time control unit that subdivides a exposure unit time into r, wherein r is an integer;
an exposure intensity control unit that switches an exposure intensity of the exposure unit into a plurality of steps;
a gradation correction unit that expands an input pixel signal of 8 bits per pixel into an expanded pixel signal of n bits per pixel, wherein n is 8 or more;
a threshold value array storage that stores a Threshold value array comprising a threshold a value of 7 bits and additional information of 1 bit for deciding the exposure intensity of the exposure unit as specific bits;
a threshold value expansion unit that expands a threshold value of 7 bits other than the specific bits to an expanded threshold value of n bits,
wherein the exposure time control unit determines an exposure time based on the input pixel signal and a difference value $\Delta n$ between the expanded pixel signal and the expanded threshold value corresponding to the threshold value that is selected for the each input pixel signal,
wherein the exposure intensity control unit determines exposure intensity of the exposure unit based on a value of the specific bit,
wherein the threshold value expansion unit includes a register that stores a scaling factor Np,
wherein the threshold value expansion unit multiplies a higher-order (n-s) bits of the threshold value by the scaling factor Np while maintaining a lower-order s bits of the threshold value to generate the expanded threshold value,
wherein, when $\Delta n<0$ is satisfied, all bits of the output pixel signal are set to 0,
wherein, when $\Delta n>\Delta h'$ is satisfied, all bits of the output pixel signal are set to 1,
wherein in other cases the output pixel signal is set to satisfy $\Delta n/(2^s)$ where a fractional portion is discarded or curtailed,
wherein $\Delta h'$ is a constant and satisfies $\Delta h'=Np\times(2^s)-1$, and
wherein $\Delta n$ is a difference value between the expanded pixel signal and the expanded threshold value corresponding to the threshold value that is selected for each input pixel signal.

* * * * *